(12) United States Patent
Qian et al.

(10) Patent No.: US 9,975,178 B2
(45) Date of Patent: May 22, 2018

(54) CROSS-PHASE SEPARATION OF NANOWIRES AND NANOPARTICLES

(71) Applicant: Lawrence Livermore National Security, LLC, Livermore, CA (US)

(72) Inventors: Fang Qian, Santa Cruz, CA (US); Eric Duoss, Dublin, CA (US); Jinkyu Han, San Ramon, CA (US); Thomas Han, Livermore, CA (US); Joshua Kuntz, Livermore, CA (US); Pui Ching Lan, Sacramento, CA (US); Tammy Olson, Livermore, CA (US); Christopher Spadaccini, Oakland, CA (US); Marcus A. Worsley, Hayward, CA (US); Cheng Zhu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days. days.

(21) Appl. No.: 15/212,100

(22) Filed: Jul. 15, 2016

(65) Prior Publication Data

US 2018/0015538 A1  Jan. 18, 2018

(51) Int. Cl.
| | |
|---|---|
| *B03B 5/62* | (2006.01) |
| *B22F 1/00* | (2006.01) |
| *B22F 9/24* | (2006.01) |
| *B03D 3/00* | (2006.01) |
| *B03D 1/00* | (2006.01) |
| *B82Y 40/00* | (2011.01) |

(52) U.S. Cl.
CPC .............. *B22F 1/0025* (2013.01); *B03D 1/00* (2013.01); *B03D 3/00* (2013.01); *B22F 9/24* (2013.01); *B22F 2009/245* (2013.01); *B22F 2301/10* (2013.01); *B22F 2998/10* (2013.01); *B82Y 40/00* (2013.01)

(58) Field of Classification Search
CPC ............ B03D 1/00; B03D 3/00; B22F 1/0025
USPC .......................................................... 209/208
See application file for complete search history.

(56) References Cited

U.S. PATENT DOCUMENTS

| | | | |
|---|---|---|---|
| 8,541,098 B2* | 9/2013 | Allemand | B22F 1/0025 428/292.1 |
| 9,205,493 B1* | 12/2015 | Young | B22F 9/24 |
| 2012/0138913 A1* | 6/2012 | Alsayed | B22F 1/0025 257/40 |
| 2016/0293968 A1* | 10/2016 | Wong | H01M 4/921 |
| 2017/0120341 A1* | 5/2017 | Simonato | B22F 9/24 |

OTHER PUBLICATIONS

Ye, S. et al., "A rapid synthesis of high aspect ratio copper nonowires or high-performance transparent conducting films," Chem. Comm., 2014, vol. 50, pp. 2562-2564.

(Continued)

*Primary Examiner* — Terrell H Matthews
(74) *Attorney, Agent, or Firm* — Zilka Kotab

(57) ABSTRACT

In one embodiment, a process includes creating a mixture of an aqueous component, nanowires and nanoparticles, and a hydrophobic solvent and allowing migration of the nanowires to the hydrophobic solvent, where the nanoparticles remain in the aqueous component. Moreover, the nanowires and nanoparticles are in the aqueous component before the migration.

18 Claims, 11 Drawing Sheets

(56) References Cited

OTHER PUBLICATIONS

Tang, Y., et al., "Ultralow-Density Copper Nanowire Aerogel Monoliths with Tunable Mechanical and Electrical Properties," Journal of Materials Chemistry, The Royal Society of Chemistry, 2013, vol. 1, pp. 6723-6726.

Akbulut, O. et al., "Separation of Nanoparticles in Aqueous Multiphase Systems through Centrifugation," Nano Letters, 2012, vol. 12, No. 8, pp. 4060-4064.

Jarrett, R. et al., "Silver nanowire purification and separation by size and shape using multi-pass filtration," Materials Research Innovations, vol. 20, No. 2, pp. 86-91.

Raciti, D. et al., "Highly Dense Cu Nanowires for Low-Overpotential CO2 Reduction," Nano Letters, American Chemical Society, 2015, vol. 15, pp. 6829-6835.

Pradel, K. et al., "Cross-Flow Purification of Nanowires," Agnew. Chem. Int., 2011, vol. 50, pp. 3412-3416.

Jung, S. et al., "Porous Cu Nanowire Aerosponges from One-Step Assembly and their Applications in Heat Dissipation," Adv. Materials, 2016, vol. 28, pp. 1413-1419.

Jin, M. et al., "Shape-Controlled Synthesis of Copper Nanocrystals in an Aqueous Solution with Glucose as a Reducing Agent and Hexadecylamine as a Capping Agent," Angew. Chem. Int. Ed., vol. 50, 2011, pp. 10560-10564.

\* cited by examiner

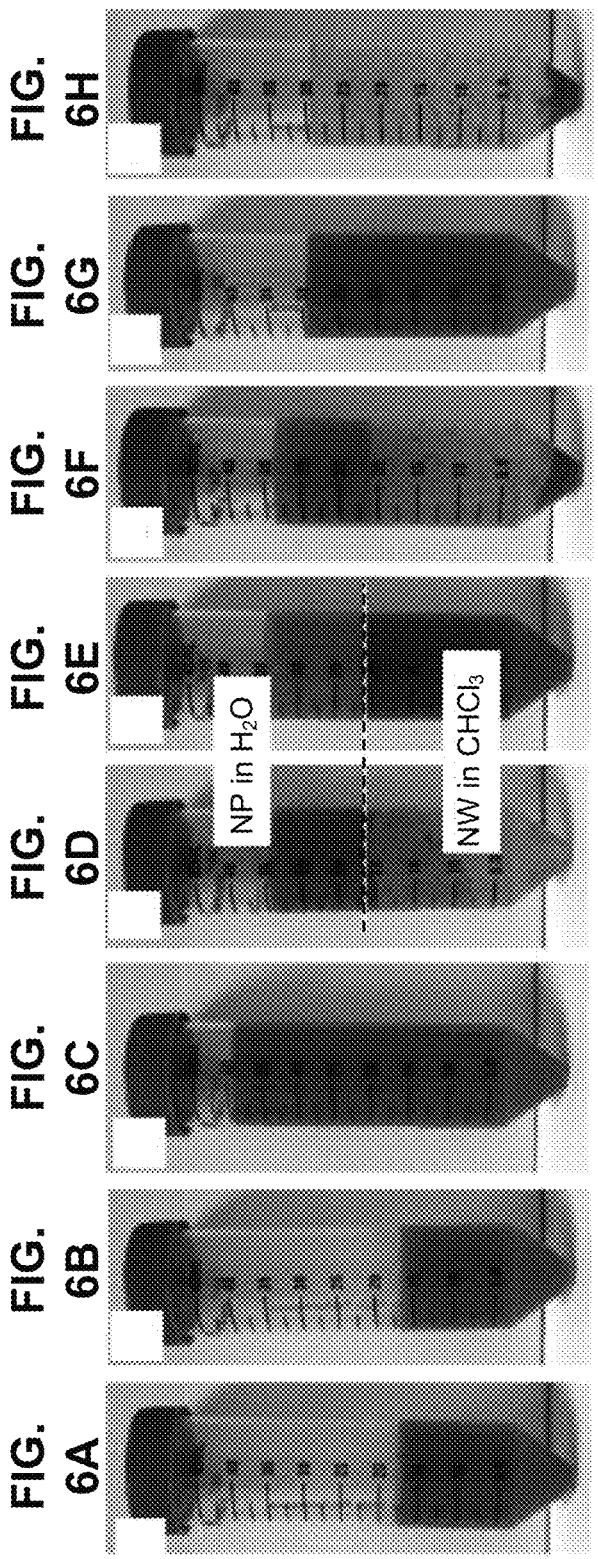

CROSS-PHASE SEPARATION OF NANOWIRES AND NANOPARTICLES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to cross-phase separation of nanowires and nanoparticles.

BACKGROUND

Metal nanowires (NWs) hold promise for commercial applications such as flexible displays, solar cells, catalysts and heat dissipaters. Among many synthesis approaches, polyol methods are the most widely used methods to produce metal NWs in large quantities with promising potential to meet the scale-up challenges for industrialization needs.

However, polyol methods not only yield nanowires but also other low-aspect ratio shapes (e. g. nanoparticles (NPs) and nanorods (NRs)). Inevitably, these by-products are almost always produced due to the non-instantaneous nucleation and the diffusion-limited crystal growth, which causes the particles to grow along multiple pathways. Moreover, with increasing synthetic scales (e.g. volume) that yield more inhomogeneous conditions, nanoparticles with unpredictable shapes may occupy even higher percentage of the products.

The presence of these undesired NP side-products reduces the NW purity, and can degrade the performance of nanowire-enabled applications and devices. For example, metal nanowire-based transparent electrodes benefit from the optical transparency of a percolated nanowire thin film, yet the NP impurities do not contribute to electrical conductivity while serve as deleterious light scattering centers to reduce light transmission.

Copper nanowires (Cu NWs) are one-dimensional copper nanocrystals that have become desirable for flexible conductive ink in extrusion-based additive manufacturing, for example, direct ink writing. Furthermore, the highly desirable conductivity property of Cu NWs also benefit such applications as transparent electrodes, aerogels, and catalysts for liquid fuel generation, heat dissipaters, etc.

Copper NWs (Cu NWs) may be synthesized using different methods, for example, polyol solution-based synthesis, template-assisted synthesis, electrolyzed deposition, and hydrothermal synthesis, vapor-to-solid synthesis, etc. The preferable polyol method uses a surfactant as a capping agent and is carried out in an aqueous solution at low-temperatures and under ambient conditions that are particularly suitable for large-scale production with low cost.

Following synthesis by some methods, Cu NWs inevitably are accompanied by large quantities of Cu nanoparticles (Cu NPs) as side products. In some applications, the Cu NPs may be undesirable as they may be deleterious for device performance. However, in other applications, the purification of Cu NPs may be preferable to the Cu NWs. Thus, isolation and purification of each population would be advantageous.

NWs and NPs are difficult to separate after synthesis because they are synthesized in the same pot and have similar physical and chemical properties. Methods to separate NPs from NWs have been laborious, expensive, and require bulky centrifugation set-up. Thus, these methods are difficult to scale up. In addition, these methods do not produce high-purity NWs or NPs.

Accordingly, it would be desirable to efficiently separate and purify nanowires and nanoparticles with 100% separation yield. In the case of copper nanowires, it would be desirable to isolate highly purified copper nanowires.

SUMMARY

In one embodiment, a process includes creating a mixture of an aqueous component, nanowires and nanoparticles, and a hydrophobic solvent, and allowing migration of the nanowires to the hydrophobic solvent, where the nanoparticles remain in the aqueous component. Moreover, the nanowires and nanoparticles are in the aqueous component before the migration.

Other aspects and advantages of the present invention will become apparent from the following detailed description, which, when taken in conjunction with the drawings, illustrate by way of example the principles of the invention.

BRIEF DESCRIPTION OF THE DRAWINGS

FIGS. 6A-H is a series of images of each step of the method according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of a method of cross-phase separation of nanowires and nanoparticles and/or related systems and methods.

In one general embodiment, a process includes creating a mixture of an aqueous component, nanowires and nanoparticles, and a hydrophobic solvent and allowing migration of the nanowires to the hydrophobic solvent, where the nanoparticles remain in the aqueous component. Moreover, the nanowires and nanoparticles are in the aqueous component before the migration.

A list of acronyms used in the description is provided below.

$CHCl_3$ chloroform
Cu NP copper nanoparticles
Cu NW copper nanowires
FT-IR Fourier transform infrared spectroscopy
HDA hexadecylamine
JCPDS Joint Committee on Powder Diffraction Standards
NP nanoparticles
NW nanowires
SEM scanning electron micrograph
TGA thermogravimetric analysis
XRD X-ray powder diffraction There is a need for a simple, efficient, and inexpensive method to separate and purify nanowires (NWs) and nanoparticles (NPs). The presently disclosed inventive concepts include a new process using cross-phase separation of NWs and NPs. The process is based on the unique observation that NWs can cross the interface between a wide range of hydrophobic organic solvents while the NPs cannot and remain in the hydrophilic solvent.

Figure 1:
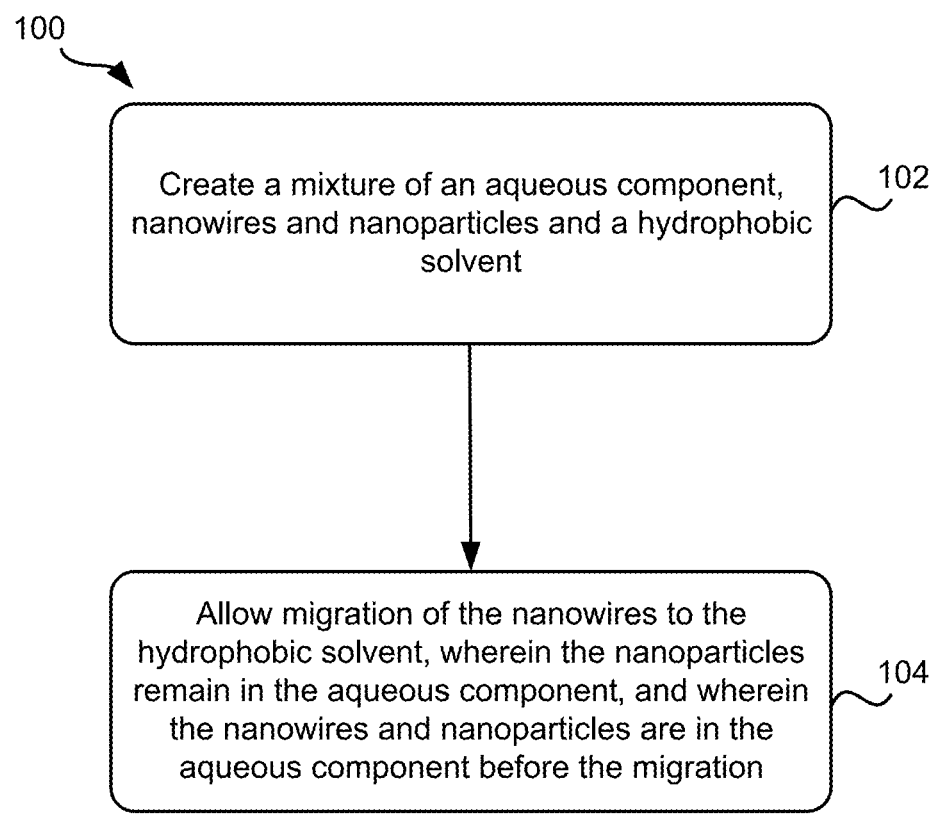
FIG. 1 is a flowchart of a method according to one embodiment.

FIG. 1 shows a method 100 for separation of NPs and NWs, in accordance with one embodiment. As an option, the present method 100 may be implemented to separate NWs and NPs such as those shown in the other FIGS. described herein. Of course, however, this method 100 and others presented herein may be used to provide applications which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

An exemplary method for separating NWs from NPs using cross-phase separation is provided in detail below according to one embodiment. This method may provide benefits in the fields of direct ink printing, transparent electrodes, high-efficient catalysts, heat dissipation and more.

Step 102 of method 100, as illustrated in FIG. 1 includes creating a mixture of an aqueous component, nanowires (NWs) and nanoparticles (NPs), and a hydrophobic solvent. In one approach, the aqueous component may be water. In other approaches, the aqueous component may be ethylene glycol, glycerol, ethanol, oleylamine, or liquid-crystalline medium of HDA and cetyltriamoninum bromide.

In one embodiment, step 102 includes combining an aqueous component having nanowires (NWs) and nanoparticles (NPs) therein with a hydrophobic solvent thereby creating a bi-phase liquid system. For example, Cu NWs and Cu NPs, present following synthesis of the nanowires, is shown in the SEM image of FIG. 2B.

In another approach, the aqueous component may be added to the hydrophobic solvent, and then a mixture of NWs and NPs may be added to the bi-phasic liquid system.

Referring to FIG. 1, according to one embodiment of step 102 in method 100, the hydrophobic solvent may be organic and immiscible in water. In a preferred approach, the hydrophobic solvent may be chloroform ($CHCl_3$). In other approaches, the hydrophobic solvent may be toluene, hexane, isoheptane, etc. In approaches where the hydrophobic solvent is of lower density than water, for example, toluene or hexane, the hydrophobic phase may form above the aqueous phase.

According to one embodiment of step 102 of method 100, the nanowires (NWs) and nanoparticles (NPs) may be metallic. In some approaches, NWs and NPs may be copper, gold, or silver, or a combination thereof. In a preferred embodiment, the NWs and NPs may be copper.

In other approaches, the NWs and NPs may be of a semiconductor material that may include but not limited to: silicon, germanium, many metal oxides (zinc oxide, tin oxide, lead oxide, titanium oxide, vanadium oxide, nickel oxide, iron oxide, copper oxide), cadmium sulfide, cadmium selenide, zinc sulfide, zinc selenide, cadmium telluride, zinc telluride and their alloys.

In yet other approaches, the NWs and NPs may be ceramic, for example, silicon carbide, tungsten carbide, silica, alumina oxide, lead zirconate titanate, barium titanate, boron oxide, boron nitride, zirconia dioxide, uranium oxide, etc.

Figures 2A, 2B:
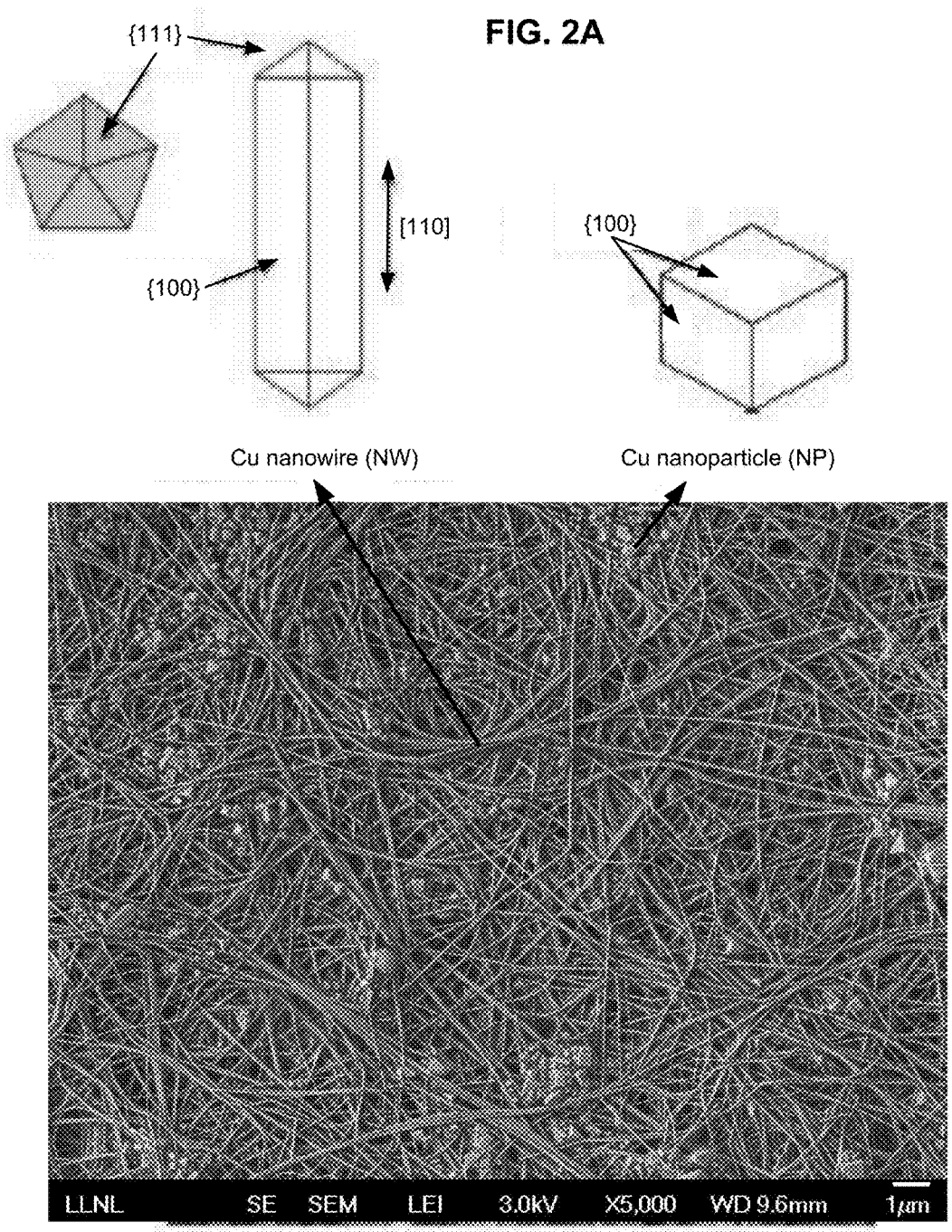
FIG. 2A is a drawing of the facet planes of nanowires and nanoparticles.
FIG. 2B is a scanning electron micrograph image of copper nanowires and copper nanoparticles.

According to one embodiment of method 100 (FIG. 1), the NWs may have {111} facets on ends. In other embodiments the NPs may have {100} facets on ends. In a preferred embodiment, as shown in the drawing of FIG. 2A, Cu NWs are be penta-twin crystals in which the NW crystal is grown along [110] crystal plane and have ten end-facet {111} crystal planes and five side-facet {100} crystal planes. Cu NPs, on the other hand, are crystal cubes in which all six sides are similar {100} facet crystal planes (FIG. 2A). The facets planes {100} and {111} of Cu may have different surface charge density, and then by extension, the hydrophilicity of each facet plane may be different.

In another embodiment of the method 100, separation of gold (Au) nanoparticles and nanowires may have facet {111} crystal planes as well as side-facet {100} crystal planes and may have a different contact angle. Thus, Au NPs and Au NWs may have different hydrophilicities which may allow cross-phase separation as described herein.

Referring to FIG. 1, an embodiment of step 102 of method 100 includes a surfactant, which may be present in the aqueous mixture for stabilizing the NWs and NPs in the aqueous component. In some approaches, the surfactant in the aqueous component may derive from the synthesis method of the NWs and NPs, for example, the polyol synthesis method. In other approaches, the surfactant may be added to an aqueous component containing NWs and NPs. In some embodiments, the surfactant, acting as a capping agent to stabilize the NWs and NPs, is hydrophobic, and preferably may be a hydrophobic alkyamine.

Figure 3:
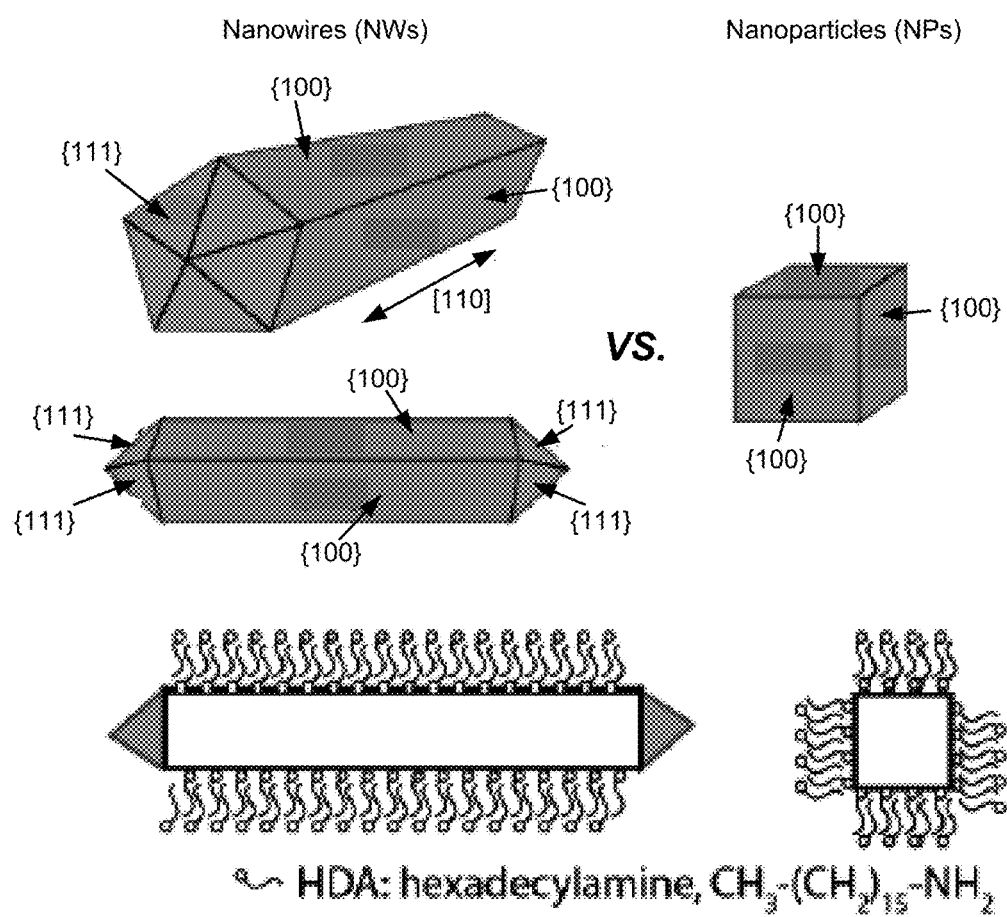
FIG. 3 is a drawing of nanowires and nanoparticles with hydrophobic surfactant according to one embodiment.

According to one illustrative embodiment, as shown in the drawing in FIG. 3, Cu NWs and Cu NPs are stabilized in a component of surfactant, for example a hydrophobic cationic capping agent hexadecylamine (HDA), or ethylamine, polyvinylpyrrolidone, cetyltriamoninum bromide, oleic acid, oleylamine, or octadecyl amine. HDA molecules may bind preferentially to {100} facet surfaces and tend not to bind to {111} facet surfaces. Thus, as shown in FIG. 3, the cubic Cu NPs may be coated with HDA molecules whereas the Cu NWs may only be coated with HDA on the {100} facets without any HDA binding on the end-facet {111} surfaces. The presence of surfactant, for example HDA, bound to a crystal facet surface may stabilize all the {100} facets surfaces of the Cu NP in the aqueous phase. Thus, the cube Cu NPs coated with HDA may prefer to remain in the aqueous phase. The Cu NWs have end-facet {111} surfaces where the HDA may not bind, and thus may be drawn to the hydrophobic solvent phase.

Referring back to FIG. 1, step 104 of method 100 includes allowing migration of the NWs to the hydrophobic solvent, where the NPs may remain in the aqueous component and where the nanowires and nanoparticles may be in the aqueous component before the migration. In some embodiments, the mixture of an aqueous component with NWs and NPs and hydrophobic solvent, may be mixed, stirred, vortexed, etc. The phases may be allowed to separate by standing undisturbed or by centrifugation until phase separation is observed.

In some approaches, the NWs may separate to the hydrophobic solvent and settle as a pellet at the bottom of the reaction tube. In other approaches in which the hydrophobic solvent may have less density than the aqueous phase and thus the hydrophobic phase may be above the aqueous phase, the NWs may migrate up into the hydrophobic phase. Thus, the migration may be independent of gravity.

In other approaches, the aqueous phase that may contain the NPs may be decanted or removed to a separate container, collected by centrifugation, and rinsed with aqueous solvent.

In yet another approach, the pellet that may contain NWs from the hydrophobic solvent may be resuspended in fresh hydrophobic solvent and collected by centrifugation.

Figure 4A:
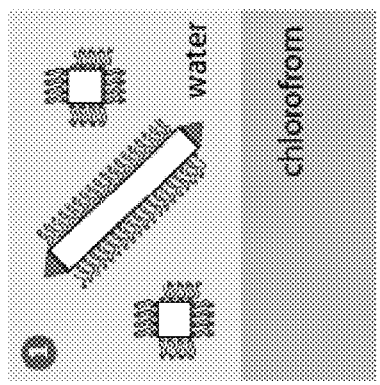
FIGS. 4A-D is an illustration of the method according to one embodiment.

FIGS. 4A-D show an illustrative embodiment of cross phase separation of Cu NWs and Cu NPs. In FIG. 4A, the aqueous component, water in this illustration, may contain NWs with the surfactant HDA bound to the side-facets {100} but not bound to the end-facets {111} and may contain NPs with the surfactant HDA bound to all side facets {100} of the cube. The hydrophobic solvent, $CHCl_3$ in this illustration, is the bottom phase and the aqueous component, water in this illustration, is the top phase.

Figure 4B:
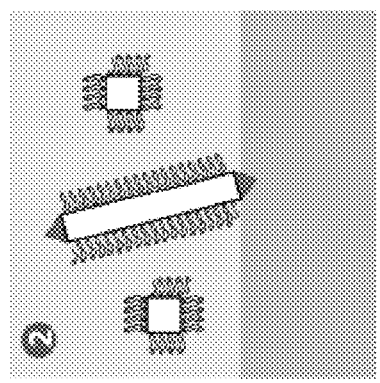

In FIG. 4B, the NWs with the end-facets {111} without bound HDA may migrate to the interface between the water and the $CHCl_3$. The NPs with HDA coating the cube crystal may prefer to remain in the aqueous component phase (water).

Figure 4C:
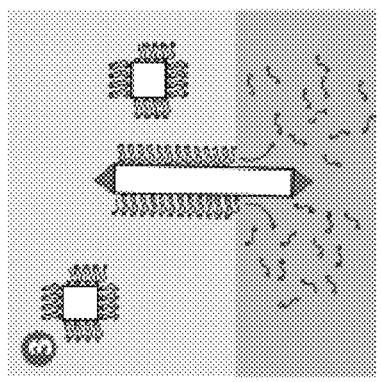

In FIG. 4C, as the NWs may migrate across the interface and enter the hydrophobic phase, $CHCl_3$, the HDA may be released from the side-facets {100} of the NWs and may be dissolved into the hydrophobic solvent, $CHCl_3$. The inventors believe the rapid dissolution of the HDA from the NW surface may serve as a driving force to further pull the NW into the chloroform until the NW complete departs from the aqueous phase. In other observations, after initial combination of the aqueous and hydrophobic phases, the NWs may be enriched near the interface and then may cross the interface spontaneously. While the precise mechanism is not known, and without wishing to be bound by any theory, the inventors believe the NPs may be repelled from the interface due to large interfacial surface tension.

Figure 4D:
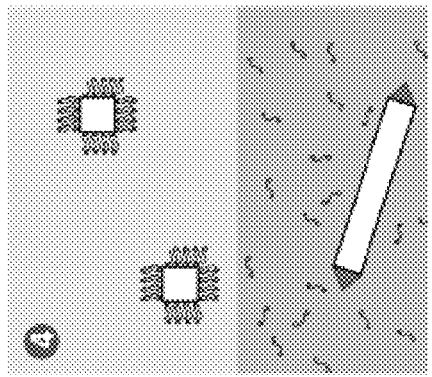

FIG. 4D shows the separation of the NWs, without HDA coating, in the hydrophobic $CHCl_3$ phase and HDA-coated NPs in the aqueous component phase. Furthermore, the hydrophobic phase may serve a dual function by separating the NWs from the NPs and by stripping the surfactant, in this case HDA, from the NWs. Without being bound by theory, the inventors believe that because the separation process may depend on the distinguished facet differences and total surface area between the NWs and NPs, rather than the size, mass, or aspect ratio employed in conventional separation methods, the purification result using the method described herein may be highly reproducible and selective.

With continued reference to FIG. 1, some embodiments of the cross phase separation method 100 result in purity of NWs where the NWs may be at least 95% separation yield of the solid material in the hydrophobic solvent after the migration, and preferably at least 98% separation yield where separation yield represents the number of NWs counted and compared to the total material within representative SEM images. In other embodiments, method 100 results in purity where the NPs may be at least 95% separation yield of the solid material in the aqueous component after the migration, and preferably 98% separation yield where separation yield represents the number of NPs counted and compared to the total material within representative SEM images, assuming no other solid material is added other than the NPs and NWs.

In some approaches, the method 100 (see FIG. 1) involves NWs that may have a length to diameter aspect ratio of at least 10 and NPs may be typically in the range below 10.

In use, purification of NWs may benefit the large scale self-assembly of Cu NWs.

Purification of NWs or NPs conductive polymer-based ink formation that may be useful in direct ink printing in extrusion-based additive manufacturing, ink jet writing printed electronics, etc. Furthermore, purified NPs or NWs may render electrical conductivity to 3D printed objects.

In the semiconductor industry, purified nanostructures may benefit flexible conductive thin film used in flexible displays, flexible electronics, wearable electronics, etc.

In liquid fuel generation and solar cell applications, purified conductive NWs may expand aerogel applications for both low and high density aerogels, catalysts, and heat dissipation.

EXPERIMENTAL

All chemicals and solvents were purchased from Sigma-Aldrich (St. Louis, Mo.) and used as received. The scanning electron microscopy (SEM) images were collected in a Hitachi S-4800 II SEM. Powder XRD studies were carried out with a Rigaku Americas Miniflex Plus powder diffractometer. Diffraction patterns were recorded from 20 to 80° 2θ with a step size of 0.04° at 1°/min. (TGA) analysis was performed in argon with temperature increased to 500° C. at 5° C./min. FT-IR studies were performed using an ALPHA FTIR Spectrometer (Bruker. Inc).

Cu NWs were synthesized through a modified polyol method using the surfactant hexadecylamine (HDA) as a capping agent. In brief, 2.1 g $CuCl_2$, 5 g glucose and 18 g HDA were added to 1000 ml deionized water, and stirred vigorously overnight at room temperature to obtain a blue emulsion. The emulsion was then sealed in either an autoclave or a glass bottle, heated statically in an oven at 100° C. for 12 hrs, and then cooled to room temperature. After the reaction, the colour of the solution turned brownish red, indicating the reduction of Cu (II) ions.

Figures 5A, 5B:
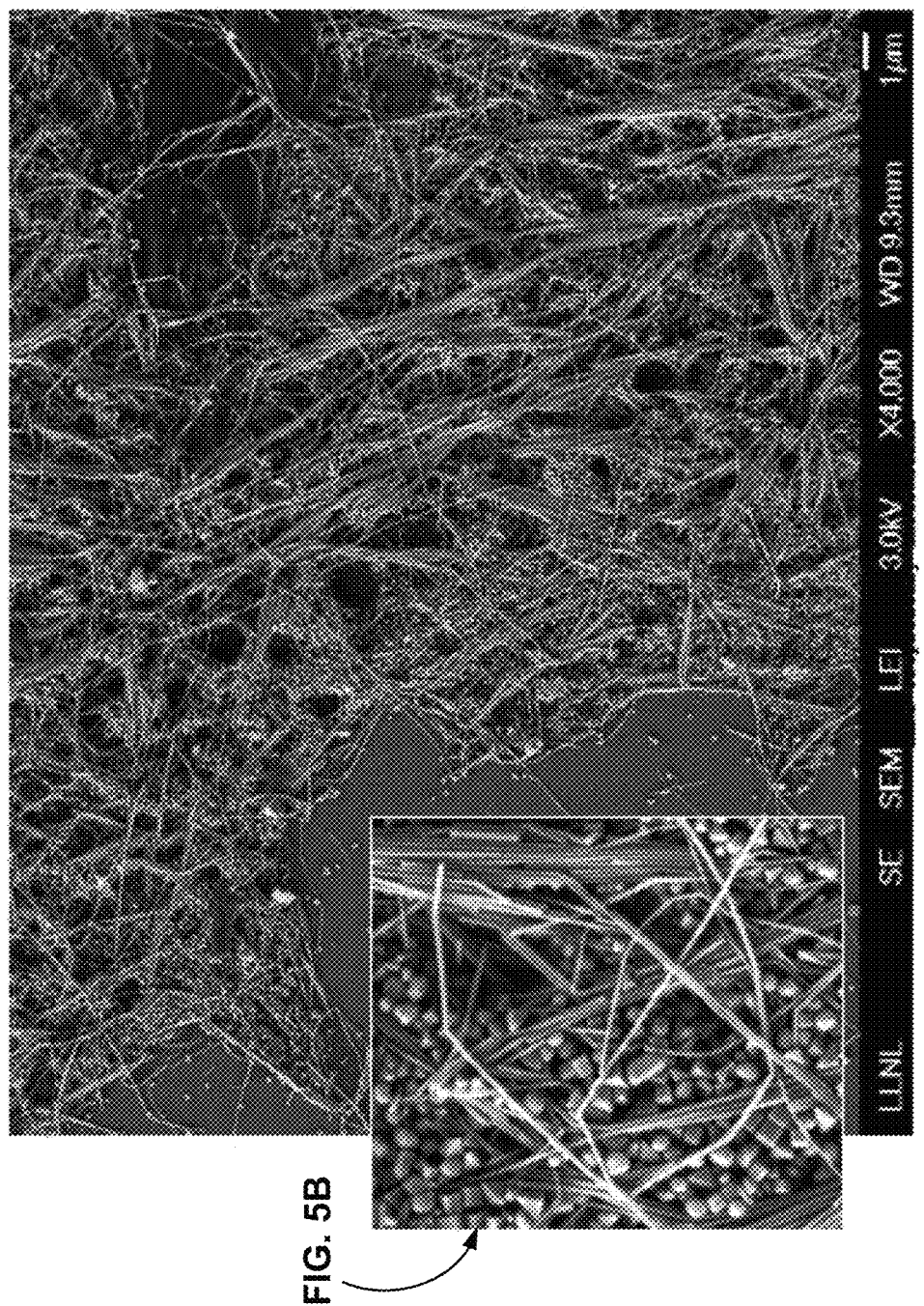
FIGS. 5A-B are scanning electron micrograph images of a single sample of copper nanowires and copper nanoparticles at different magnifications.

FIG. 5A shows a SEM image of the as-made solution that contained Cu NWs and Cu NPs. FIG. 5B is a higher magnification of the image in FIG. 5A. The figure shows the tangled mix of Cu NWs and Cu NPs.

The separation of Cu NWs and Cu NPs was achieved by adding the hydrophobic organic solvent, $CHC_{13}$. FIGS. 6A-H illustrate the detailed procedure described as follows. The original solution (FIG. 6A) was centrifuged at 10K rpm for 10 min. The supernatant which contained majority of excessive HDA was discarded, and the pellet was re-suspended in water (FIG. 6B). Subsequently, chloroform was added to the mixture and vortexed for 5-10 seconds (FIG. 6C). After the vortexing, the chloroform and water phases separated immediately showing a clear interface (FIG. 6D). Simultaneously, red flakes, which were later confirmed to be Cu NW aggregates, were seen to cross the interface spontaneously and settled down in the bottom chloroform phase (dark bottom layer, FIG. 6E). Complete settling of Cu NWs occurred in about 30 minutes. Alternatively, centrifugation can be used to accelerate NW settling (FIG. 6F). The water phase was collected using a transferring pipette, and the NW pellet was suspended in chloroform (FIG. 6G). The NW pellet was collected and re-suspended in chloroform (FIG. 6H).

Figure 7:
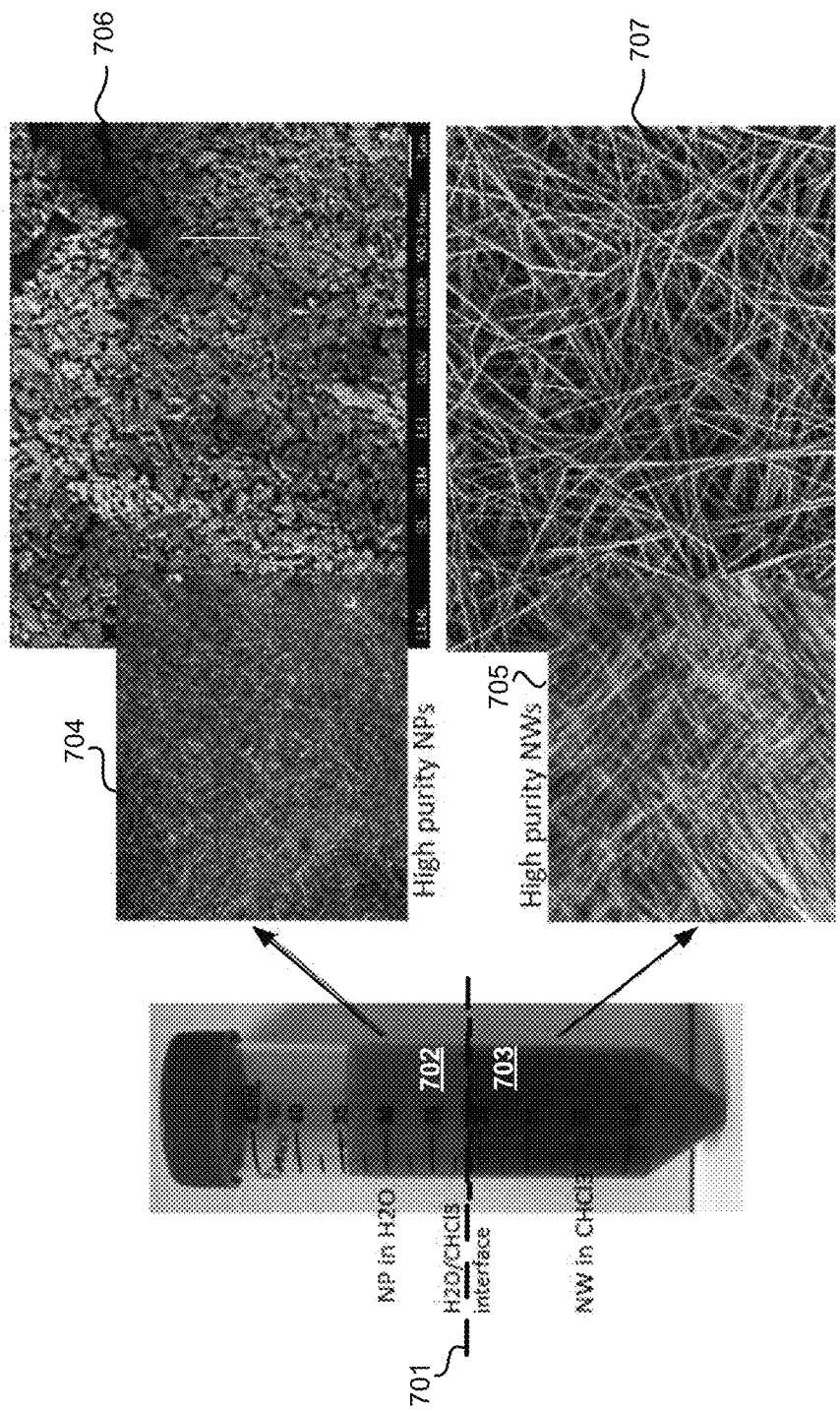
FIG. 7 is an illustration of the separation of phases of the method according to one embodiment with scanning electron micrograph images of each phase.

FIG. 7 shows the separation phases of the water phase 702 and purified the chloroform phase 703, of which each phase is separated by the interface 701. From each phase, purified particles were collected. The aqueous phase 702 contained highly purified Cu NPs 704, as identified by SEM image 706. The chloroform phase 703 contained highly purified Cu NWs 705, as identified by SEM image 707.

Prior to purification, the mixture contained long Cu NWs mixed with substantial amount of Cu NPs (see FIGS. 5A-B). The NWs had an average diameter of 20-50 nm and length varying from tens to hundreds microns as observed by SEM image (707, FIG. 7). The NPs were mainly nanocubes with a large size distribution from several ten's to hundred's nanometers as observed by SEM image (706, FIG. 7). Other shapes (e.g. sphere, tetrahedral) were also observed.

Figure 8:
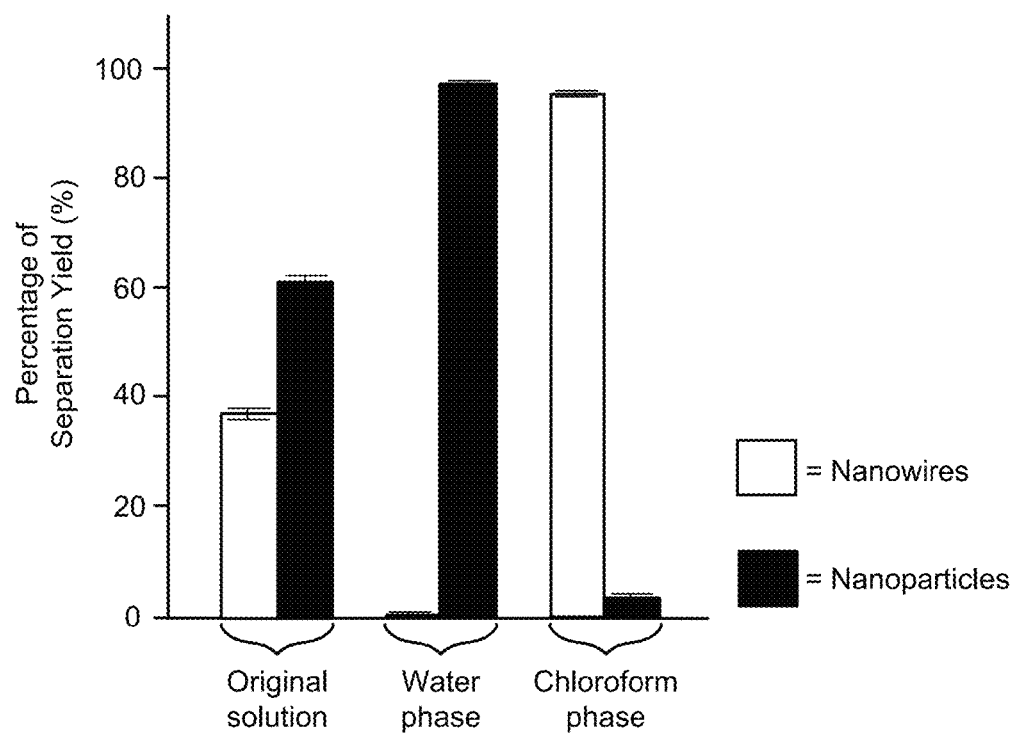
FIG. 8 is a bar graph of the percentage of nanoparticles and nanowires in each phase according to one embodiment.

The amount of Cu NWs and Cu NPs in the original solution compared to the amounts of each respectively following cross-phase separation is shown in the bar graph in FIG. 8. The y-axis indicates Percentage of Separation Yield (%) which was measured by counting the numbers of Cu NWs (white bars, FIG. 8) and Cu NPs (solid black bars, FIG. 8) from representative SEM images of samples collected in the original (see FIG. 5A), water (Cu NPs in 706, see FIG. 7), and chloroform phases (Cu NWs in 707, see FIG. 7). Statistical analysis shows that the fraction of Cu NWs in the original solution, water phase and chloroform phase were 38.7±3.7, 1.4±1.0 and 95.2±2.3% separation yield, respectively. These results suggested efficient separation of the Cu NPs from the Cu NWs and enrichment of high-purity Cu NWs (solid white bars, FIG. 8).

Figure 9:
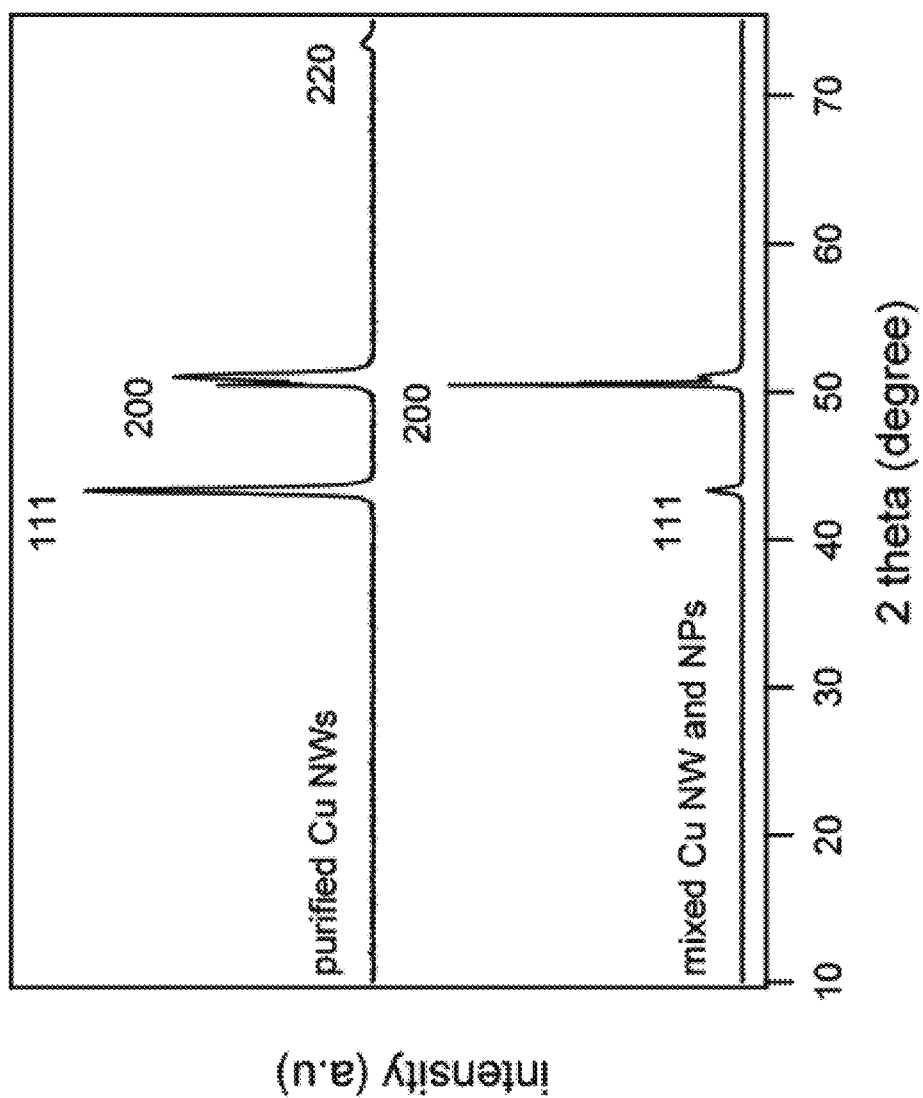
FIG. 9 is the X-ray powder diffraction graph of purified copper nanowires and mixed copper nanowires and nanoparticles according to one embodiment.

The non-purified and purified Cu NW products were analyzed by X-ray powder diffraction (XRD) to identify the crystal structure patterns of the products as shown in FIG. 9. Non-purified Cu NW product (lower graph, FIG. 9) resulted two distinct peaks at 2theta=43.2 and 50.3, corresponding to diffractions of {111} and {200} planes of a face-centred cubic Cu (#04-0836 of the Joint Committee on Powder Diffraction Standards (JCPDS)). Without being bound by any theory, the inventors believe the low intensity ratio between {111} to {200} indicated the presence of large amounts copper nanocubes in the mixture. In the upper graph of FIG. 9, the purified product exhibited three distinct peaks at 2theta=43.2, 50.5, and 73.4, corresponding to the {111}, {200}, and {220} planes respectively. The inventors believe the great intensity ratio between {111} to {200} indicated the enrichment of {111} crystal planes of the copper nanowires. Furthermore, the inventors indicate that the peak ratio between {111} and {200} is shown as largely reduced in purified NWs, consistent with the removal of nanocubes bounded by six {100} facets. The calculated lattice constant from this XRD pattern was 3.6304 Å, which is very close to reported value of 3.615 Å (JCPDS File 01-085-1326) of purified Cu crystals.

Figure 10A:
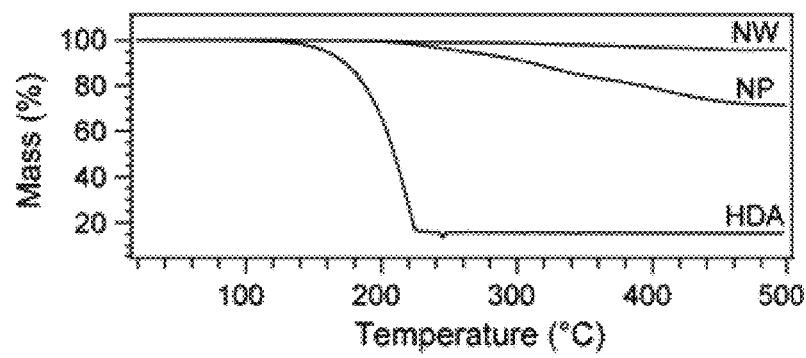
FIG. 10A is a graph of the thermogravimetric analysis of nanowires and nanoparticles from different phases according to one embodiment.

To determine the amount of surface polymer coating on the Cu nanocrystals, the inventors carried out thermogravimetric analysis (TGA) on both NPs and NWs collected from respective phases (FIG. 10A). Both samples were washed with water (NPs) and chloroform (NWs) again, and dried under vacuum at room temperature. TGA analysis was carried out in argon with temperature increased to 500° C. at 5° C./min (FIG. 10A). A control experiment of pure HDA showed abrupt mass loss, near 75% around 200° C. which was attributed to the thermal decomposition and carbonization of HDA. The NP sample showed a more steady mass loss up to 29% with a plateau around 480° C. Slower mass loss is commonly seen in NP-polymer conjugates which form a porous network, and thus it would take longer for the polymer trapped in the pore to escape versus the pure polymer. In contrast, the Cu NW sample exhibited negligible mass loss (4%), indicating minimum polymer coating on NW surface after being washed with chloroform.

Figure 10B:
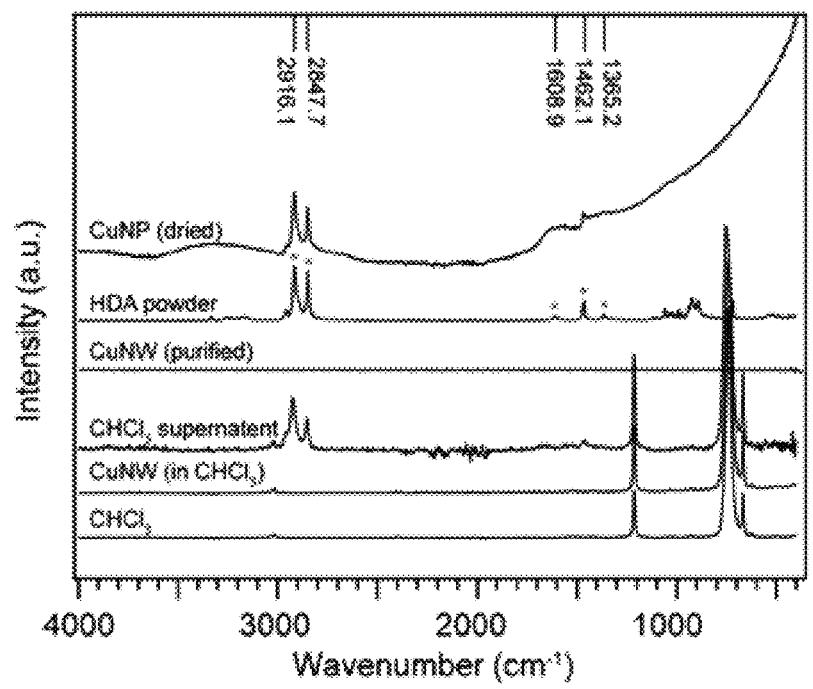
FIG. 10B is a graph of the chemical composition of copper nanocrystals analyzed by Fourier transform infrared spectroscopy according to one embodiment.

The chemical composition of the Cu nanocrystals was analyzed by Fourier transform infrared spectroscopy (FT-IR) (FIG. 10B). In FIG. 10B, the FT-IR spectra collected from pure HDA powder, dried Cu NPs and dried Cu NWs, as well as from pure chloroform, chloroform supernatant, and Cu NWs re-suspended in chloroform were compared. Pure HDA powder showed five characteristic IR peaks at 1365.2, 1462.1, 1608.9, 2847.7 and 2916.1 $cm^{-1}$. These peaks were clearly present in the spectra obtained from the dried Cu NPs as well as the chloroform supernatant, but these peaks were not observed in purified Cu NWs either in dried state or in chloroform suspension. Taken together and without being bound by any theory, the inventors believe the TGA and FT-IR data suggest HDA was still conjugating with NPs in the water phase, but HDA was absent from the surface of NWs as it was dissolved in chloroform. Thus, the separation procedure described herein isolated Cu NPs from Cu NWs.

Figure 11A:
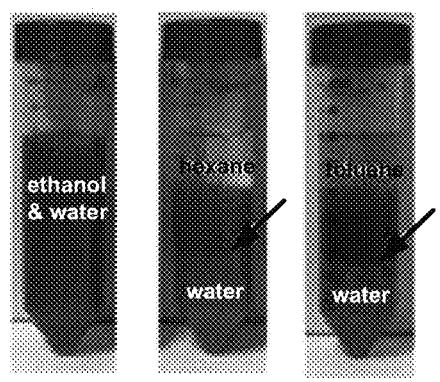
FIGS. 11A-D are images of the method according to various embodiments.
Figure 11B:
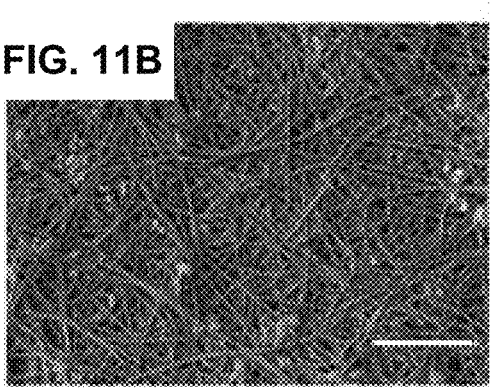
Figure 11C:
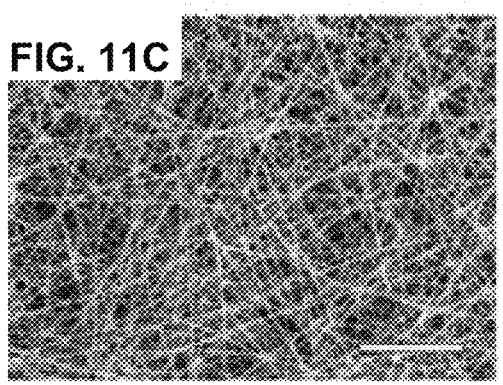
Figure 11D:
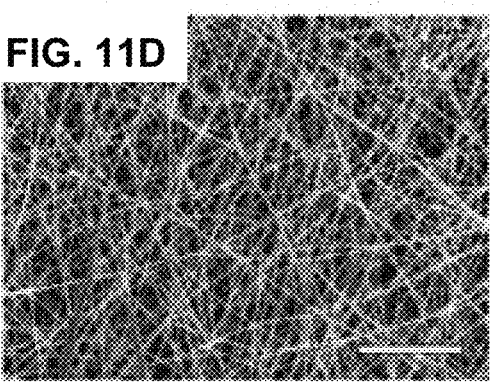

The inventors conducted the separation method described herein with alternative solvents. FIG. 11A shows the effectiveness of separation with ethanol (left tube), hexane (middle tube), and toluene (right tube) added to aqueous suspension containing both NPs and NWs. After vigorous vortexing and settling, the addition of ethanol yielded homogenous solution, while hexane and toluene were immiscible with water and formed two phases with a distinct interface (black arrows, FIG. 11A). As mentioned previously, the low density of hexane and toluene compared to water causes the hydrophobic phase to be above the aqueous phase (FIG. 11A). Migration of the NWs moved upwards towards the hydrophobic phase. FIGS. 11B-D show the SEM images of the purified NWs collected from the hydrophobic phase (hexane, FIG. 11C and toluene, FIG. 11D) or the mixture in the tube (ethanol with no distinct phases, FIG. 11B). The SEM images confirmed that ethanol did not demonstrate any separation effect (FIG. 11B), while the use of the hydrophobic organic solvents hexane (FIG. 11C) and toluene (FIG. 11D) produced high-purity NWs similar to those produced with $CHCl_3$.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A process, comprising:
creating a mixture of an aqueous component, nanowires and nanoparticles, and a hydrophobic solvent; and
allowing migration of the nanowires to the hydrophobic solvent, wherein the nanoparticles remain in the aqueous component,
wherein the nanowires and nanoparticles are in the aqueous component before the migration.

2. The process of claim 1, wherein the hydrophobic solvent is organic.

3. The process of claim 1, wherein the hydrophobic solvent is selected from a group consisting of chloroform, hexane, toluene, and isoheptane.

4. The process of claim 1, wherein the nanowires and nanoparticles are metallic.

5. The process of claim 4, wherein the nanowires and nanoparticles are selected from a group consisting of copper, gold and silver.

6. The process of claim 1, wherein the nanowires and nanoparticles are of a semiconductor material.

7. The process of claim 1, wherein the nanowires and nanoparticles are ceramic.

8. The process of claim 1, wherein a surfactant is present in the aqueous mixture for stabilizing the nanowires and nanoparticles in the aqueous component.

9. The process of claim 8, wherein the surfactant is hydrophobic.

10. The process of claim 1, wherein the nanowires have {111} facets on ends thereof.

11. The process of claim 1, wherein the nanoparticles have {100} facets on ends thereof.

12. The process of claim 1, wherein the nanowires comprise at least 95% separation yield of a solid material in the hydrophobic solvent after the migration.

13. The process of claim 1, wherein the nanoparticles comprise at least 95% separation yield of a solid material in the aqueous component after the migration.

14. The process of claim 1, wherein the nanowires have a length to diameter aspect ratio of at least 10.

15. A process, comprising:
creating a phase separated system of an aqueous component, a hydrophobic solvent phase separated from the aqueous component, and nanowires and nanoparticles in the aqueous component; and
allowing migration of the nanowires from the aqueous component to the hydrophobic solvent, wherein the nanoparticles remain in the aqueous component.

16. The process of claim 15, wherein a surfactant is present in the aqueous component for stabilizing the nanowires and nanoparticles in the aqueous component.

17. A process, comprising:
creating a phase separated system of an aqueous component having a hydrophobic surfactant therein, a hydrophobic solvent phase separated from the aqueous component, and nanowires and nanoparticles in the aqueous component; and
allowing migration of the nanowires from the aqueous component to the hydrophobic solvent, wherein the nanoparticles remain in the aqueous component.

18. The process of claim 8, wherein the surfactant binds preferentially to {100} facet surfaces and does not bind to {111} facet surfaces.

* * * * *